United States Patent [19]

Hou

[11] Patent Number: 5,659,686
[45] Date of Patent: Aug. 19, 1997

[54] METHOD OF ROUTING A MESSAGE TO MULTIPLE DATA PROCESSING NODES ALONG A TREE-SHAPED PATH

[75] Inventor: ChiYeh Hou, Sandy, Utah

[73] Assignee: Unisys Corporation, Blue Bell, Pa.

[21] Appl. No.: 310,916

[22] Filed: Sep. 22, 1994

[51] Int. Cl.$^6$ .......................... G06F 15/163; G06F 13/14; H04H 1/12

[52] U.S. Cl. ................. 395/200.68; 395/200.79; 395/200.82; 370/390; 370/392

[58] Field of Search .................... 370/60, 60.1, 94.3, 370/390, 392, 393; 395/200.02, 200.05, 200.15, 311, 312; 340/825.03, 826, 827

[56] References Cited

U.S. PATENT DOCUMENTS

| | | | |
|---|---|---|---|
| 4,598,400 | 7/1986 | Hillis | 370/60 |
| 4,814,973 | 3/1989 | Hillis | 364/200 |
| 4,933,933 | 6/1990 | Dally et al. | 370/60 |
| 5,105,424 | 4/1992 | Flaig et al. | 370/94.1 |
| 5,111,198 | 5/1992 | Kuszmaul | 340/835.02 |
| 5,117,420 | 5/1992 | Hillis | 370/60 |
| 5,175,733 | 12/1992 | Nugent | 370/94.3 |
| 5,309,433 | 5/1994 | Cidon. et al. | 370/60 |
| 5,347,450 | 9/1994 | Nugent | 395/200 |
| 5,425,021 | 6/1995 | Derby et al. | 370/54 |
| 5,436,893 | 7/1995 | Barnett | 370/60.1 |
| 5,440,548 | 8/1995 | Denissen | 370/60 |
| 5,483,522 | 1/1996 | Derby et al. | 370/54 |
| 5,487,064 | 1/1996 | Galand et al. | 370/60 |
| 5,500,860 | 3/1996 | Perlman et al. | 370/85.13 |
| 5,511,168 | 4/1996 | Perlman et al. | 395/200.15 |
| 5,513,322 | 4/1996 | Hou | 395/200.15 |
| 5,546,596 | 8/1996 | Geist | 395/200.02 |

OTHER PUBLICATIONS

Turner, J.S., "Design of a Broadcast Packet Network," Proceedings of the IEEE INFOCOM'86 Fifth Annual Conference Computers and Communications Integration Design, Analysis, Management, Apr., 8–19, 1986, pp. 667–675.

Wortman, Leon A., et al., "The C Programming Tutor," Robert J. Brady Co., Bowie, MD, 1984, pp. 223–249. Dec. 1984.

Primary Examiner—Alyssa H. Bowler
Assistant Examiner—Richard J. Gregson
Attorney, Agent, or Firm—Charles J. Fassbender; Mark T. Starr; Steven R. Petersen

[57] ABSTRACT

In a parallel processor, a plurality of data processing nodes are intercoupled through an array of message routing circuits. Each message routing circuit has multiple input channels on which messages are received and multiple output channels on which messages are sent. A message on an input channel of any one particular message routing circuit contains a header followed by data with the header consisting of a sequence of control characters which route the data. Depending on the control character sequence that is received on an input channel, the data is sent to one, two, or three output channels and each such data transmission is preceded by a respective modified header which is generated from the header on the input channel. By sequentially performing this message processing in a series of message routing circuits, the data is delivered to multiple nodes along a tree-shaped path.

14 Claims, 7 Drawing Sheets

$\underline{MRC(5,4)}$ ⟵ 20

LOCAL IN CH. ⟶ $H_{L1} H_{T1} D$

+X OUT CH. ⟶ $H_{L1}' D$

−X OUT CH. ⟶ $H_{T1}' D$ $\underline{MRC(5,3)}$ ⟵ 21

−X IN CH. ⟶ $H_{T1}' D \equiv H_{L2} H_{T2} D$

+Y OUT CH. ⟶ $H_{L2}' D$

−Y OUT CH. ⟶ $H_{T2}' D$ $\underline{MRC(6,3)}$ ⟵ 22

+Y IN CH. ⟶ $H_{L2}' D$

+Y OUT CH. ⟶ $H_{L2}' D$ $\underline{MRC(7,3)}$ ⟵ 23

+Y IN CH. ⟶ $H_{L2}'' D$

−X OUT CH. ⟶ $H_{L2}''' D$ $\underline{MRC(7,2)}$ ⟵ 24

−X IN CH. ⟶ $H_{L2}''' D \equiv H_{L3} H_{T3} D$

−Y OUT CH. ⟶ $H_{L3}' D$

−X OUT CH. ⟶ $H_{T3}' D$

LOCAL IN CH. ⟶ $D$

FIG. 2

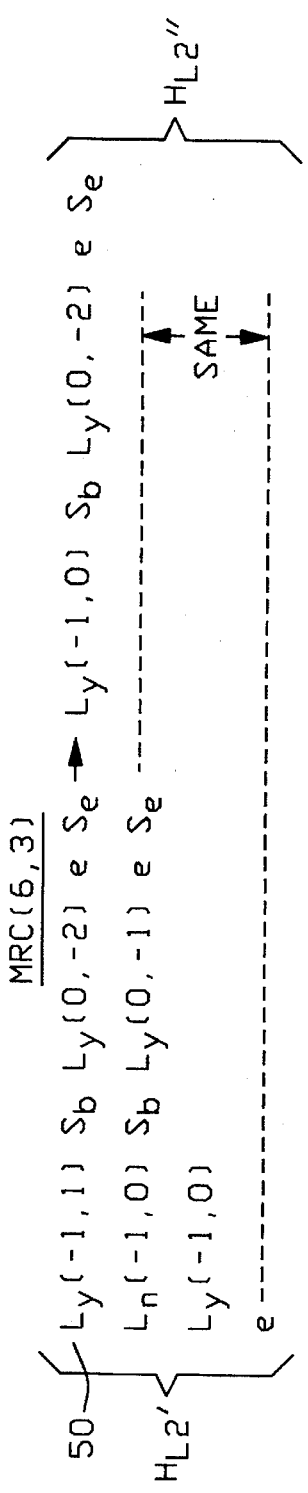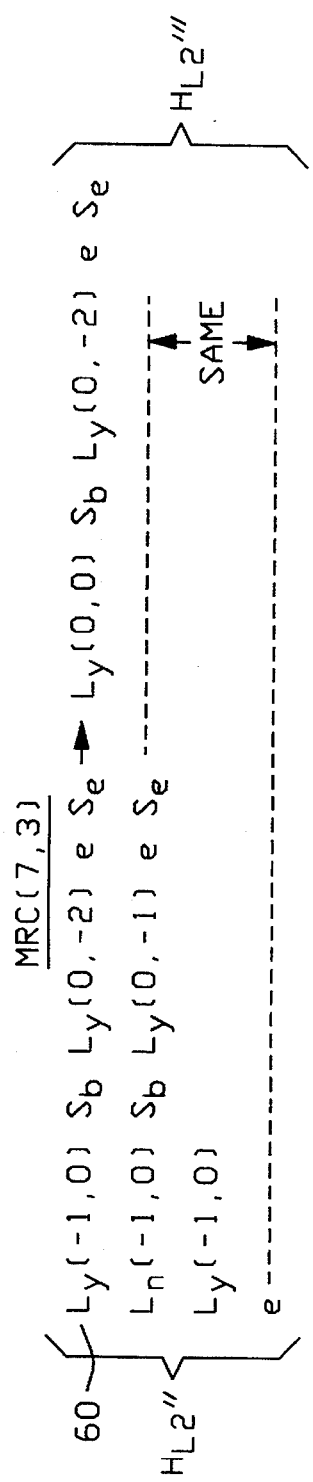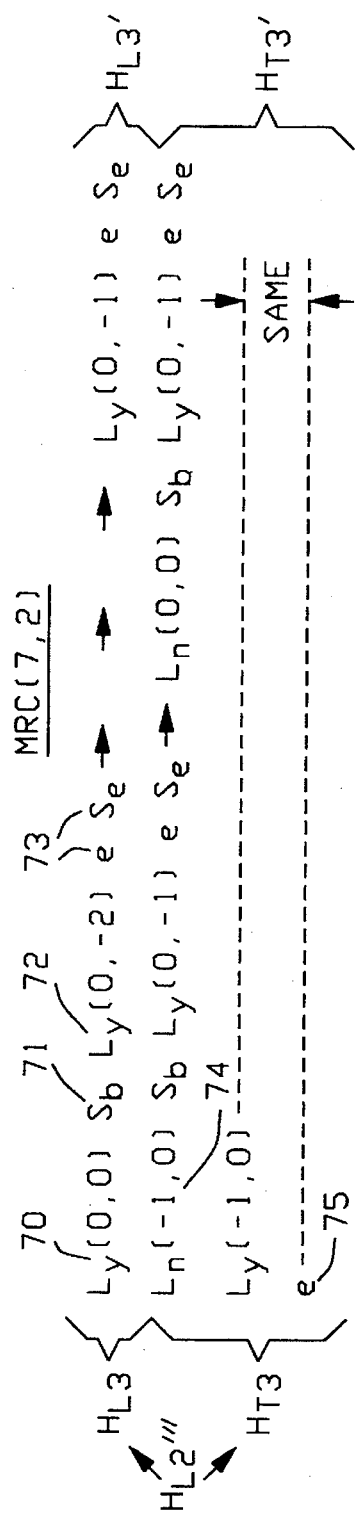

METHOD OF ROUTING A MESSAGE TO MULTIPLE DATA PROCESSING NODES ALONG A TREE-SHAPED PATH

CROSS REFERENCES TO RELATED APPLICATIONS

U.S. Pat. No. 5,513,322 entitled "MultiPath Message Routing Without Deadlocks."

BACKGROUND OF THE INVENTION

This invention relates to the field of data processing; and more particularly, it relates to methods of routing a message through an array of data processing nodes such that the message can be distributed to many nodes at scattered locations very quickly.

As used herein, the term data processing node is meant to include the combination of at least the following items: a microprocessor chip, a memory coupled to the microprocessor chip, and an input-output channel for external data transfers to and from the microprocessor chip. Here, the microprocessor/memory/input-output channel can have any internal make-up.

A single data processing node has use by itself in that the memory can store a program for the microprocessor chip to execute, and data on which the program operates can be sent to the data processing node via the input-output channel. However, when a plurality data processing nodes are intercoupled together in an array, several advantages over a single data processing node are achieved.

Such an array is formed by providing with each data processing node, a respective message routing circuit which has multiple input-output channels. Then in the actual array, the input-output channels of the message routing circuits and data processing nodes are all intercoupled together. This array is herein referred to as a parallel processor.

One advantage of the above parallel processor is that it provides a selectable or scalable amount of computing power. To increase/decrease its computing power, some data processing nodes are simply added to/deleted from the array. Another advantage of the above parallel processor is that it provides computing power which is fail-soft. This means that one or more data processing nodes can fail and be in need of repair, while the remaining nodes in the array continue to operate.

However, the overall performance of the above parallel processor is greatly affected by the process by which a message is routed from one source node S to many receiving nodes R at scattered locations in the array. Such a message can, for example, specify a task for each receiving node to perform. If the time that it takes for all of the receiving nodes to receive their respective tasks is reduced, then the time that it takes for all of the receiving nodes to complete those tasks will likewise be reduced.

Presently in the art, Intel Corporation sells a parallel processor, called the "Paragon", which comprises a plurality of data processing nodes that are intercoupled in an array through respective message routing circuits. However, a major drawback with the Paragon is that each message which travels through the array can only be sent from one source node S to one receiving node R. That is, each message has a point-to-point route. Consequently, in order to send a message from one source node to many receiving nodes, a series of point-to-point messages need to be sent; and, establishing the corresponding series of point-to-point routes consumes a large amount of time.

Accordingly, a primary object of the invention is to provide an improved method of routing messages through an array of data processing nodes whereby the above drawback is overcome.

BRIEF SUMMARY OF THE INVENTION

In accordance with the present invention, a message is passed through a message routing circuit (MRC) in a parallel processor, by the following steps:

identifying a lead header and a trail header and data within the message on one input channel to the MRC;

selecting a first output channel from the MRC in response to one of the headers and modifying that one header to reflect the selection;

sending the modified one header on the first output channel;

storing the data in the MRC while simultaneously sending the data on the first output channel;

selecting a second output channel from the MRC in response to the remaining header and modifying the remaining header to reflect the selection; and, sending the modified remaining header and the stored data on the second output channel.

When the above steps are performed in one MRC, the path which the message takes through that MRC forms a branch with two arms. Thus, by performing the above steps in multiple MRC's of a parallel processor, the path which the message takes becomes tree-shaped with many branches and many arms. Due to this tree-shaped path, a message is sent to many receiving nodes much more quickly than can otherwise be achieved by a series of point-to-point messages.

BRIEF DESCRIPTION OF THE DRAWINGS

FIG. 2 shows an overview on the process by which five message routing circuits in the FIG. 1 parallel processor form the tree-shaped path.

FIG. 5 shows, on a detailed level, the process by which another message routing circuit MRC(6,3) passes the message of FIG. 1 and 2.

FIG. 6 shows, on a detailed level, the process by which another message routing circuit MRC(7,3) passes the message of FIG. 1 and 2.

FIG. 7 shows, on a detailed level, the process by which another message routing circuit MRC(7,2) passes the message of FIG. 1 and 2.

DETAILED DESCRIPTION

Figure 1:
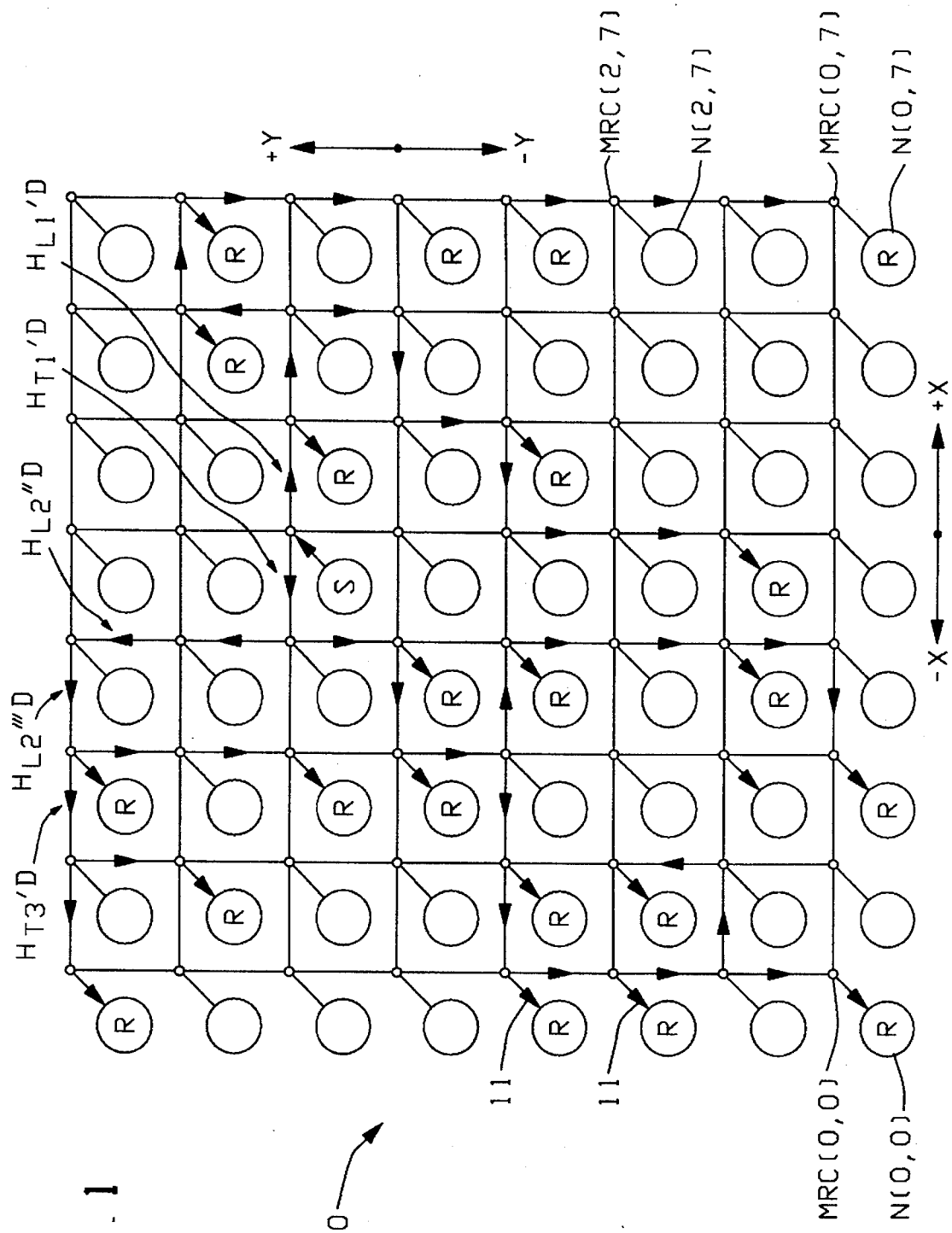
FIG. 1 shows a parallel processor in which a message is being routed along a tree-shaped path to many nodes in accordance with the present invention.

Referring now to FIG. 1, a parallel processor 10 which internally routes messages in accordance with the present invention will be described. This parallel processor 10 includes a total of sixty-four data processing nodes N(X,Y), each of which is illustrated in FIG. 1 as a large circle. Within each data processing node is a microprocessor chip, and a memory which holds instructions for the microprocessor to perform plus data for the microprocessor to operate on.

All of the data processing nodes N(X,Y) are intercoupled as an array of eight rows and eight columns. Row 0 is the bottom row; row I is the next adjacent row; etc. Column 0 is the left most column; column 1 is the next adjacent column, etc.

Node $(X_1,Y_1)$ is located at the intersection of row $X_1$ and column $Y_1$. For example, the data processing node N(0,0) is located at the bottom-left corner of the array; and node N(0,7) is located at the bottom-right corner of the array.

Also included in the parallel processor 10 are a total of sixty-four message routing circuits MRC(X,Y), each of which is illustrated in FIG. 1 as a small circle. Each message routing circuit includes from three to five input-output channels, and each such channel is illustrated in FIG. 1 as a line which extends from one of the small circles.

Message routing circuit MRC$(X_1,Y_1)$ is located at the row $X_1$-column $Y_1$ intersection. Thus, message routing circuit MRC(0,0) is located at the bottom left corner of the array. Likewise, message routing circuit MRC(0,7) is located at the bottom-right corner of the array.

All of the input-output channels of the message routing circuits are intercoupled to each other and to the data processing nodes as illustrated in FIG. 1. Over these interconnected channels, messages pass in the +X direction, −X direction, +Y direction, −Y direction, local-in direction, and local-out direction.

When a message travels in the +X direction between two adjacent message routing circuits MRC(X,Y) and MRC(X,Y+1), that message moves from the +X output channel of MRC(X,Y) to the +X input channel of MRC(X,Y+1). Similarly, a message which travels in the −X direction moves from the −X output channel of MRC(X,Y+1) to the −X input channel of MRC(X,Y).

When a message travels in the +Y direction between two adjacent message routing circuits MRC(X,Y) and MRC(X+1,Y), that message moves from the +Y output channel of MRC(X,Y) to the +Y input channel of MRC(X+1,Y). Similarly, a message which travels in the −Y direction moves from the −Y output channel of MRC(X+1,Y) to the −Y input channel of MRC(X,Y).

When a message travels in the local-in direction, that message moves from a data processing node N(X,Y) to MRC(X,Y). Conversely, a message which travels in the local-out direction moves from MRC(X,Y) to data processing node N(X,Y).

Now in accordance with the present invention, messages are sent from any one data processing node N(X,Y) through several message routing circuits MRC(X,Y) along a tree shaped path to a plurality other data processing nodes. An example of such a tree shaped path is shown in FIG. 1 wherein node N(5,4) is the source of a message as indicated the "S" within that node, and twenty-two other nodes receive the message as indicated by a "R" within those nodes.

To reach all of the receiving nodes R, the message travels in a tree shaped path which is identified by arrows 11 on the FIG. 1 input-output channels. This tree shaped path includes several branches which are started selectively by the message routing circuits MRC(5,4), MRC(5,3), MRC(7,2), MRC(7,1), MRC(3,2), MRC(1,0), MRC(5,6).

Additional details on the process by which the above message routing occurs are shown in five lists 20–24 in FIG. 2. Specifically, the lists 20, 21, 22, 23 and 24 respectively show how the tree-shaped path in FIG. 1 is formed by the message routing circuits MRC(5,4), MRC(5,3), MRC(6,3), MRC(7,3) and MRC(7,2).

Beginning with list 20, it indicates that on the local in channel of MRC(5,4), a message is received from the source node N(5,4) which consists of a lead header $H_{L1}$ followed by a trail header $H_{T1}$ followed by data D. Each of these items $H_{L1}$, $H_{T1}$, and D include several characters of information.

As the above message from node N(5,4) enters MRC(5,4), it is examined whereupon the items $H_{L1}$, $H_{T1}$ and D are identified. In response to the lead header $H_{L1}$, the message routing circuit MRC(5,4) selects its +X output channel and modifies the lead header to $H_{L1}'$ such the selection of the +X output channel is indicated. This modified lead header $H_{L1}'$ and the data D are sent to the +X output channel.

Also, in response to the trail header $H_{T1}$, the message routing circuit MRC(5,4) selects its −X output channel and modifies the trail header to $H_{T1}'$ such that the selection of the −X output channel is indicated. This modified trail header $H_{T1}'$ and the data D are sent to the −X output channel. Thus, the data D is duplicated by MRC(5,4) on its +X and −X output channels.

At the message routing circuit MRC(5,3), the above modified trail header $H_{T1}'$ and data D are received on the −X input channel. This is indicated in list 21. As the modified trail header $H_{T1}'$ is received, it is examined by the message routing circuit MRC(5,3) and found to consist of a second lead header $H_{L2}$ followed by a second trail header $H_{T2}$.

In response to header $H_{L2}$, the message routing circuit MRC(5,3) selects the +Y output channel and modifies that header to $H_{L2}'$ such that the selection of the +Y output channel is reflected. This modified header $H_{L2}'$ and the data D are sent out on the +Y output channel. Also in response to header $H_{T2}$, the message routing circuit M(5,3) selects the −Y output channel, modifies header $H_{T2}$ to $H_{T2}'$ to reflect that channel selection, and sends the modified header $H_{T2}'$ plus the data D to the selected −Y output channel.

At the message routing circuit MRC(6,3), the above modified lead header $H_{T2}'$ and data D are received on the +Y input channel. This is indicated in list 22. As the modified lead header $H_{L2}'$ is received, it is examined by the message routing circuit MRC(6,3); and in response, the message routing circuit MRC(6,3) selects just the +Y output channel. Header $H_{L1}'$ is then modified to $H_{L2}''$ such that the selection of the +Y output channel is reflected. This header $H_{L2}''$ and the data D are sent out on the +Y output channel.

At the message routing circuit MRC(7,3), the above header $H_{L2}''$ and data D are received on the +Y input channel. This is indicated in list 23. As the header $H_{L2}''$ is received, it is examined by the message routing circuit MRC(7,3); and in response, the message routing circuit MRC(7,3) selects just the −X output channel. Header $H_{L2}''$ is then modified to $H_{L2}'''$ such that the selection of the −X output channel is reflected. This header $H_{L2}'''$ and the data D are sent out on the −X output channel.

At the message routing circuit MRC(7,2), the modified lead header $H_{L2}'''$ and data D are received on the −X input channel. This is indicated in list 24. As the header $H_{L2}'''$ is received, it is examined by the message routing circuit MRC(7,2) and found to consist of a control character which calls for a local delivery of the data and a third lead header $H_{L3}$ followed by a third trail header $H_{T3}$.

In response to header $H_{L3}$, the message routing circuit MRC(7,2) selects the −Y output channel and modifies that header to $H_{L3}'$ such that the selection of the $-Y$ output channel is reflected. This modified header $H_{L3}'$ and the data D are sent out on the $-Y$ output channel.

Also in response to header $H_{T3}$, the message routing circuit MRC(7,2) selects the $-X$ output channel, modifies header $H_{T3}$ to $H_{T3}'$ to reflect that channel selection, and sends the modified header $H_{T3}'$ plus the data D to the selected $-X$ output channel. Further, in response to the control character, the message routing circuit sends the data D to the local output channel whereupon it received by the data processing node N(7,2).

Turning now to FIGS. 3–7, a preferred character structure for each of the FIG. 2 headers, as well as a preferred method by which those characters are processed in the message routing circuits MRC(X,Y), will be described. Considering first FIG. 3, the left hand side of that figure shows all of the characters within the lead header $H_{L1}$ and the trail header $H_{T1}$ as they occur on the local-in channel of MRC(5,4).

These characters within $H_{L1}$ and $H_{T1}$ enter the local-in channel of MRC(5,4) in a sequence which begins with the top most character $L_n(0,0)$. Then the sequence continues in the order $S_b$, $L_y(1,0)$, $L_n(1,0)$, $S_b$, etc. After the last character e on the bottom of FIG. 3, the data D follows as another sequence of characters; but for the sake of simplicity, the data D is not shown.

Figure 3:
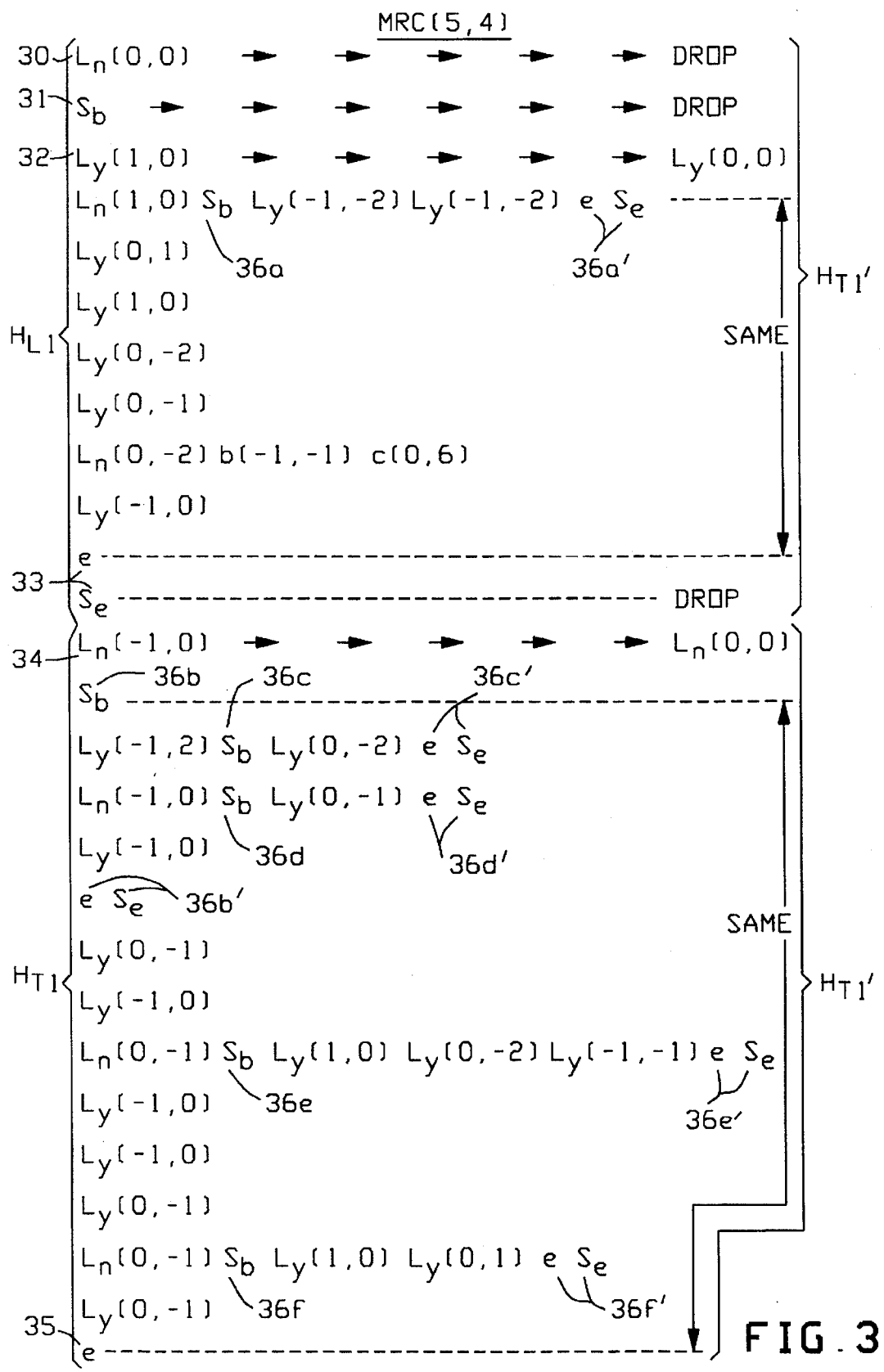
FIG. 3 shows, on a detailed level, the process by which one particular message routing circuit MRC(5,4) passes the message of FIGS. 1 and 2.

In FIG. 3, the first character 30 to enter MRC(5,4) is $L_n(0,0)$. This character indicates that the data which follows the header is not for the local node N(5,4), and that at least one more character which follows immediately thereafter needs to be examined in order to route the message further.

Next in FIG. 3, an $S_b$ character 31 enters MRC(5,4). This character 31 indicates that a branch should occur. Character 32 which follows character 31 gives routing directions for first arm of this branch, and character 33 identifies the end of the first arm. Character 34 gives routing directions for a second arm of the branch, and character 35 identifies the end of the second arm.

To route the first arm, MRC(5,4) drops characters 30 and 31; and it examines character 32 which is a $L_y(1,0)$. Here, the (1,0) indicates that the first arm is to go from the present MRC(5,4) in the $+X$ direction by a distance of 1 and go in the $+Y$ direction by a distance of 0. To accomplish this, MRC(5,4) selects its $+X$ output channel, changes $L_y(1,0)$ to $L_y(0,0)$ to reflect that selection, and sends the modified lead header $M_{L1}'$ out on the selected channel. Then, behind $H_{L1}'$, the MRC(5,4) sends the data D.

Similarly, to route the second arm, MRC(5,4) examines character 34 which is $L_n(-1,0)$. Here the $(-1,0)$ indicates that the second arm is to go from the present MRC(5,4) in the $-X$ direction by a distance of 1 and go in the $+Y$ direction by a distance of 0. To accomplish this, MRC(5,4) selects its $-X$ output channel, changes $L_n(-1,0)$ to $Ln(0,0)$ to reflect that selection, and sends the modified trail header $H_{T1}'$ out on the selected channel. Behind $H_{T1}'$ the data D is also sent by MRC(5,4).

Preferably, the FIG. 3 process is carried out in MRC(5,4) in the following sequence: 1) store $H_{L1}$; 2) convert $H_{T1}$ to $H_{T1}'$ while routing $H_{T1}'$ to the $-X$ output channel; 3) store the data D while routing the data D to the $-X$ output channel; 4) convert the stored $H_{L1}$ to $H_{L1}'$ while routing $H_{L1}'$ to the $+X$ output channel; and 5) route the stored data D to the $+X$ output channel. Alternatively, the FIG. 3 process is carried out in MRC(5,4) by the sequence: 1) convert $H_{L1}$ to $H_{L1}'$ while routing $H_{L1}'$ to the $+X$ output channel; 2) store $H_{T1}'$; 3) store the data D while routing the data D to the $+X$ output channel; 4) convert the stored $H_{T1}$ to $H_{T1}'$ while routing $H_{T1}'$ to the $-X$ output channel; 5) route the stored data D to the $-X$ output channel.

Inspection of the headers $H_{L1}$ and $H_{T1}$ in FIG. 3 shows that they both contain at least one nested branch. These nested branches are indicated by the branch characters 36a, 36b, 36c, 36d, 36e and 36f. Each nested branch has an arm which ends on an $eS_e$ character; and these characters are labeled as 36a', 36b', 36c', 36d', 36e', and 36f'.

After the MRC(5,4) identifies the $S_b$ character 31, it sequentially examines the characters which follow in order to locate an $eS_e$ character and thereby determine where the first arm of the branch ends. During that examination, the nested branch character $eS_e$ at 36a' will be encountered. However, the $eS_e$ character 36a' is preceded by the $S_b$ character 36a, and thus $eS_e$ at 33 is distinguishable from $eS_e$ at 36a'.

Preferably, to locate the $eS_e$ character 33, the MRC(5,4) —a) resets a counter to zero when it receives the $S_b$ character 31, b) increments that counter by one for each subsequent $S_b$ character that it receives, and c) decrements that counter by one for each subsequent $eS_e$ character that it receives. Then, character $eS_e$ at 33 is located by receiving a $eS_e$ character when the count is zero.

After the $eS_e$ character 33 is located, the MRC(5,4) examines all subsequent characters for an e which not followed by $S_e$. This occurs as character 35; and it identifies the end of the trail header and beginning of the data D.

Figure 4:
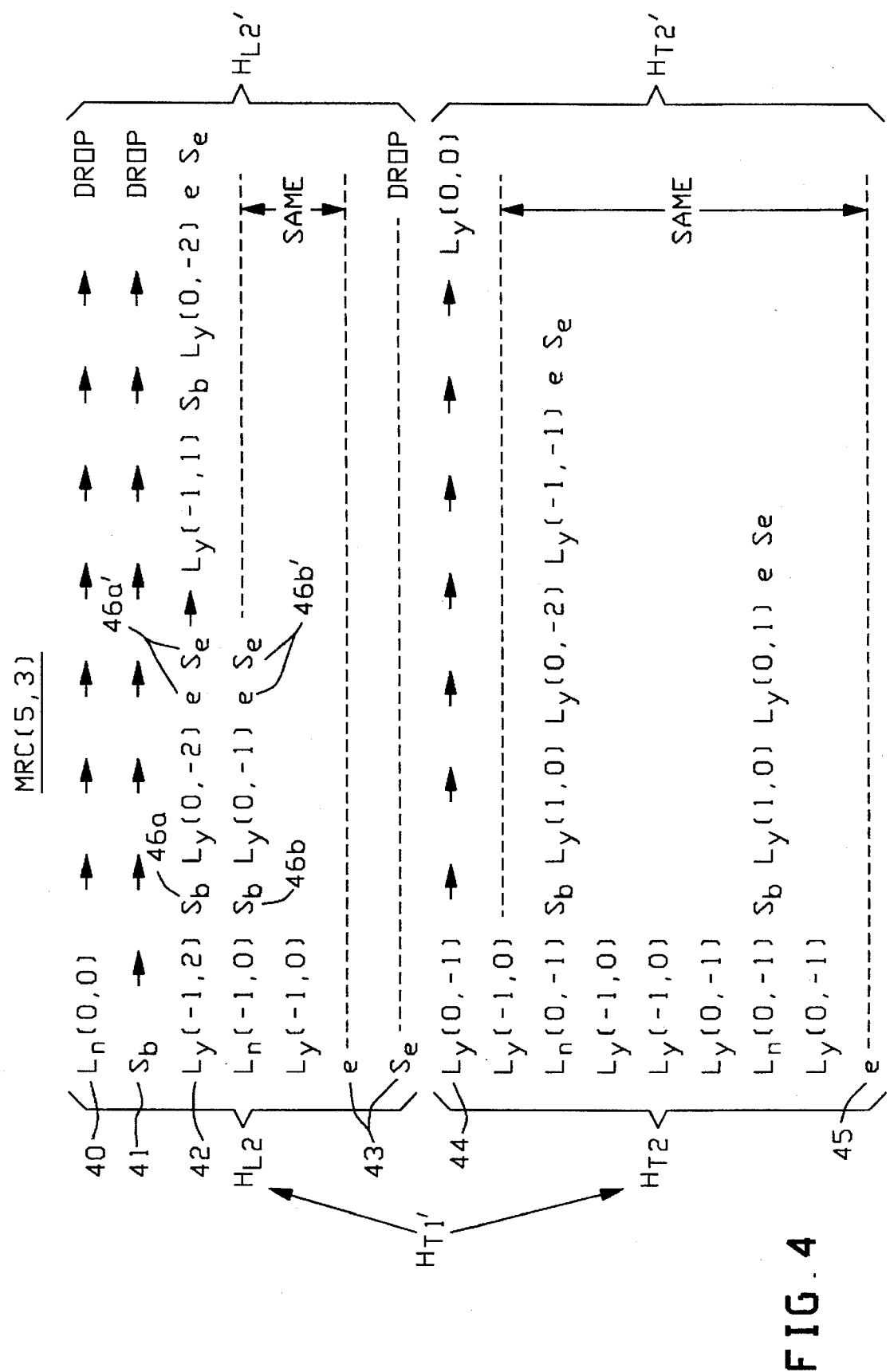
FIG. 4 shows, on a detailed level, the process by which another message routing circuit MRC(5,3) passes the message of FIG. 1 and 2.

Next, in order to see how the modified header $H_{T1}'$ passes through MRC(5,3) reference should be made to FIG. 4. There, the header $H_{T1}'$ is given on the left hand side of the figure exactly as it was generated on the right hand side of FIG. 3. Also, as the left hand side of FIG. 3 shows, the header $H_{T1}'$ consists of a second lead header $H_{L2}$ followed by a second trail header $H_{T2}$.

In FIG. 4, the first character to enter MRC(5,3) is the Ln(0,0) character 40. Here again, Ln(0,0) indicates that the data which follows the header is not to be sent to the local node N(5,3), and that at least one more character which follows immediately thereafter needs to be examined in order to route the message further.

Next, in FIG. 4, an $S_b$ character 41 enters MRC(5,3). This character 41 indicates that a branch should now occur. Character 42 which follows character 41 gives routing directions for a first arm of this branch, and character 43 identifies the end of the first arm. Character 41 gives routing directions for a second arm of the branch, and character 45 identifies the end of the second arm.

To route the first arm, MRC(5,3) drops characters 44 and 41; and it examines character 32 which is a $L_y(-1,2)$. Here, the $(-1,2)$ indicates that the first arm is to go from the present MRC(5,3) in the $-X$ direction by a distance of 1 and go in the $+Y$ direction by a distance of 2. To accomplish this, MRC(5,3) can select either its $-X$ or $+Y$ output channel. In FIG. 4, MRC(5,3) selects its $+Y$ output channel, changes $L_y(-1,2)$ to $L_y(-1,1)$ to reflect that selection, and sends the modified lead header $H_{L2}'$ out on the selected channel. Then, behind $H_{L2}'$, the MRC(5,3) sends the data D.

Similarly, to route the second arm, MRC(5,3) examines character 44 which is $L_y(0,-1)$. Here the $(0,-1)$ indicates that the second arm is to extend from the present MRC(5,3) in the $+X$ direction by a distance of 0 and extend in the $-Y$ direction by a distance of 1. To accomplish this, MRC(5,3) selects its $-Y$ output channel, changes $L_y(0,1)$ to $L_y(0,0)$ to reflect that selection, and sends the modified trail header $H_{T2}'$ out on the selected channel. Behind $H_{T2}'$ the data D is also sent by MRC(5,3).

After the MRC(5,3) identifies the $S_b$ character 41, it must examine the characters which follow in order to find an $eS_e$ character and thereby determine where the first arm of the branch ends. During that examination, the nested branch end characters $eS_e$ at 46a' and 46b' will be encountered. However, the $eS_e$ characters 46a' and 46b' are preceded by the $S_b$ characters 46a and 46b, and thus $eS_e$ at 43 is distinguishable from $eS_e$ at 46a' and 46b'.

Next, in order to see how the modified header $H_{L2}$' passes through MRC(6,3), reference should be made to FIG. 5. There, the header $H_{L2}$' is given on the left hand side of the figure exactly as it was generated on the right hand side of FIG. 4.

In FIG. 5, the first character to enter MRC(6,3) is the $L_y(-1,1)$ character 50. Here, the $L_y(-1,1)$ indicates that the entire header $H_{L2}$ needs to travel from MRC(6,3) in the $-X$ direction by a distance of i and in the $+Y$ direction by a distance of 1. To accomplish this, MRC(6,3) selects its $+Y$ output channel, changes $L_y(-1,1)$ to $L_y(-1,0)$ to reflect that selection, and sends the modified header $H_{L2}$" out on the selected channel. Then behind $H_{L2}$" the MRC(6,3) sends the data D.

Next, in order to see how the modified header $H_{L2}$" passes through MRC(7,3), reference should be made to FIG. 6. There, the header $H_{L2}$" is given on the left hand side of the figure exactly as it was generated on the right hand side of FIG. 5.

In FIG. 6, the first character to enter MRC(7,3) is the $L_y(-1,0)$ character 60. Here, the $L_y(-1,0)$ indicates that the entire header $H_{L2}$" needs to travel from MRC(7,3) in the $-X$ direction by a distance of 1 and in the $+Y$ direction by a distance of 0. To accomplish this, MRC(7,3) selects its $-X$ output channel, changes $L_y(-1,0)$ to $(0,0)$ to reflect that reflection, and sends the modified $H_{L2}$'" out on the selected channel. Then behind $H_{L2}$'" the MRC(7,3) sends the data D.

Lastly, in order to see how the modified header $H_{L2}$'" passes through MRC(7,2), reference should be made to FIG. 7. There, the header $H_{L2}$'" is given on the left hand side of the figure exactly as it was generated on the right hand side of FIG. 6.

In FIG. 7, the first character to enter MRC(7,2) is the $L_y(0,0)$ character 70. Here, the $L_y(0,0)$ indicates that the data which follows the header is to be sent to the local node N(7,2), and that at least one more character which follows immediately thereafter needs to be examined in order to route the message further.

Next in FIG. 7, an $S_b$ character 71 indicates that a branch should occur. Character 72 which follows character 71 gives routing directions for a first arm of this branch, and character 73 identifies the end of the first arm. Character 74 gives routing directions for a second arm of the branch, and character 75 identifies the end of the second arm.

To route the first arm, MRC(7,2) drops characters 70 and 71; and it examines character 72 which is a $L_y(0,-2)$. This indicates that the first arm is to extend from the present MRC(7,2) in the $+X$ direction by a distance of 0 and extend in the $-Y$ direction by a distance of 2. To accomplish this, MRC(7,2) selects its $-Y$ output channel, changes $L_y(0,-2)$ to $L_y(0,-1)$ to reflect that selection, and sends the modified lead header $H_{L3}$' out on the selected channel. Then, behind $H_{L3}$', the MRC(7,2) sends the data D.

Similarly, to route the second arm, MRC(7,2) examines character 74 which is $L_y(-1,0)$. This indicates that the second arm is to extend from the present MRC(7,2) in the $-X$ direction by a distance of 1 and extend in the $+Y$ direction by a distance of 0. To accomplish this, MRC(7,2) selects its $-X$ output channel, changes $L_n(-1,0)$ to $L_n(0,0)$ to reflect that selection, and sends the modified trail header $H_{T3}$' out on the selected channel. Behind $H_{T3}$' the data D is also sent by MRC(7,2).

Thereafter, in response to the previously examined $L_y(0,0)$ character 70, the MRC(7,2) selects its local-out channel. Then the MRC(7,2) sends the data D over the local-out channel to the data processing node N(7,2).

Figure 8:
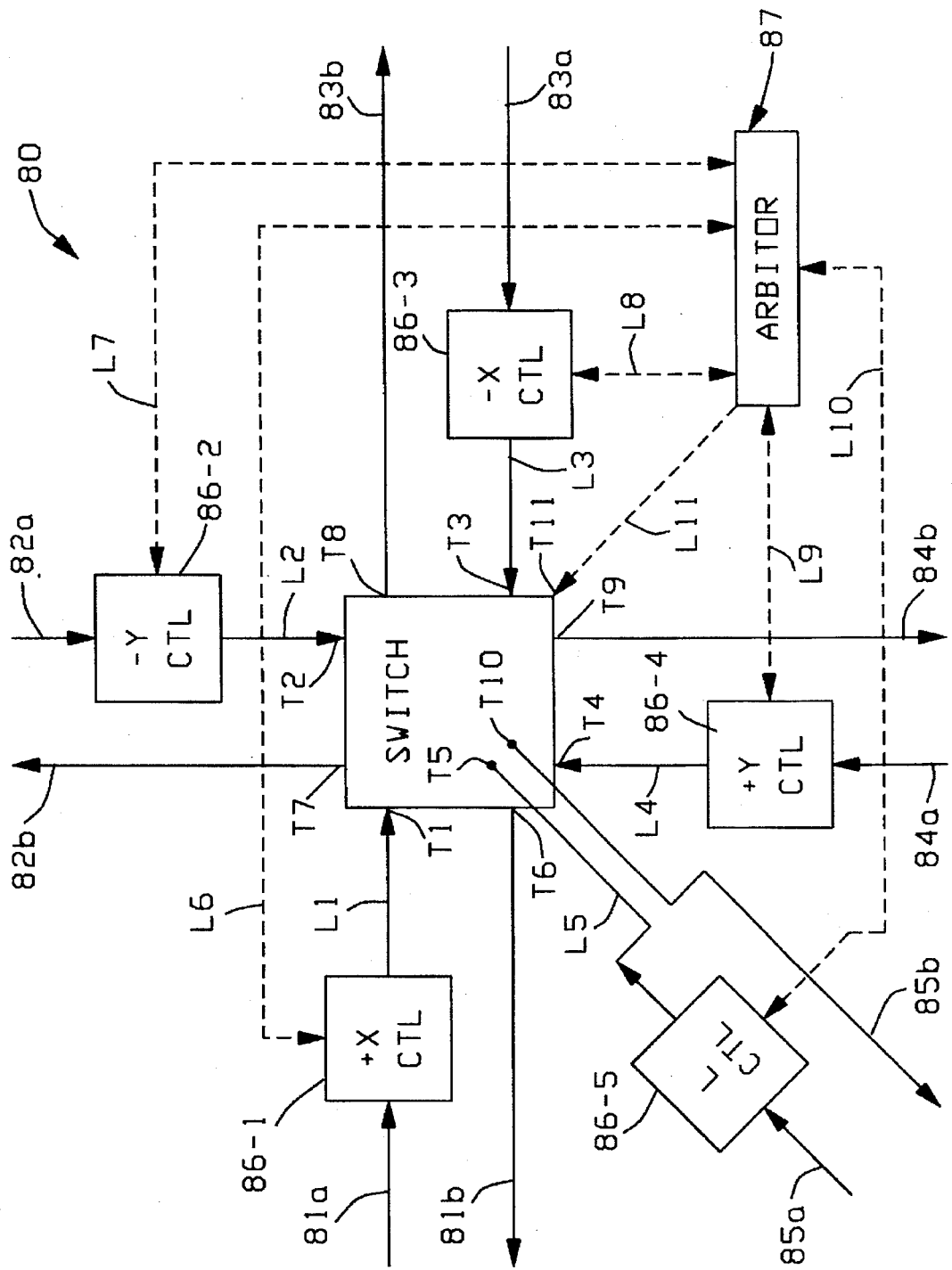
FIG. 8 is a detailed circuit diagram of a preferred internal structure for each of the message routing circuits in the FIG. 1 parallel processor.

Turning now to FIG. 8, a preferred internal structure 80 for each of the message routing circuits MRC(X,Y) will be described. In this embodiment, the input channels and output channels are identified as follows: $+X$ input channel is 81a; $-X$ output channel is 81b; $-Y$ input channel is 82a; $+Y$ output channel is 82b; $-X$ input channel is 83a; $+X$ output channel is 83b; $+Y$ input channel is 84a; $-Y$ output channel is 84b; local-in channel is 85a; and local-out channel is 85b.

Also included in the FIG. 8 embodiment are several circuit modules 85, 86-1 thru 86-5, and 87. Each of these modules is described below, and they are intercoupled to each other by signal lines L1–L11 as shown in FIG. 8.

Module 85 is a switch circuit which has five input terminals T1–T5, five output terminals T6–T10, and a control terminal T11. In operation, control signals are received on the control terminal T11; and in response to those signals, the input terminals are selectively connected to the output terminals. For example, in response to one set of control signals, T1 connects to T7 and T5 connects to T8 and T4 connects to T10.

Figure 9:
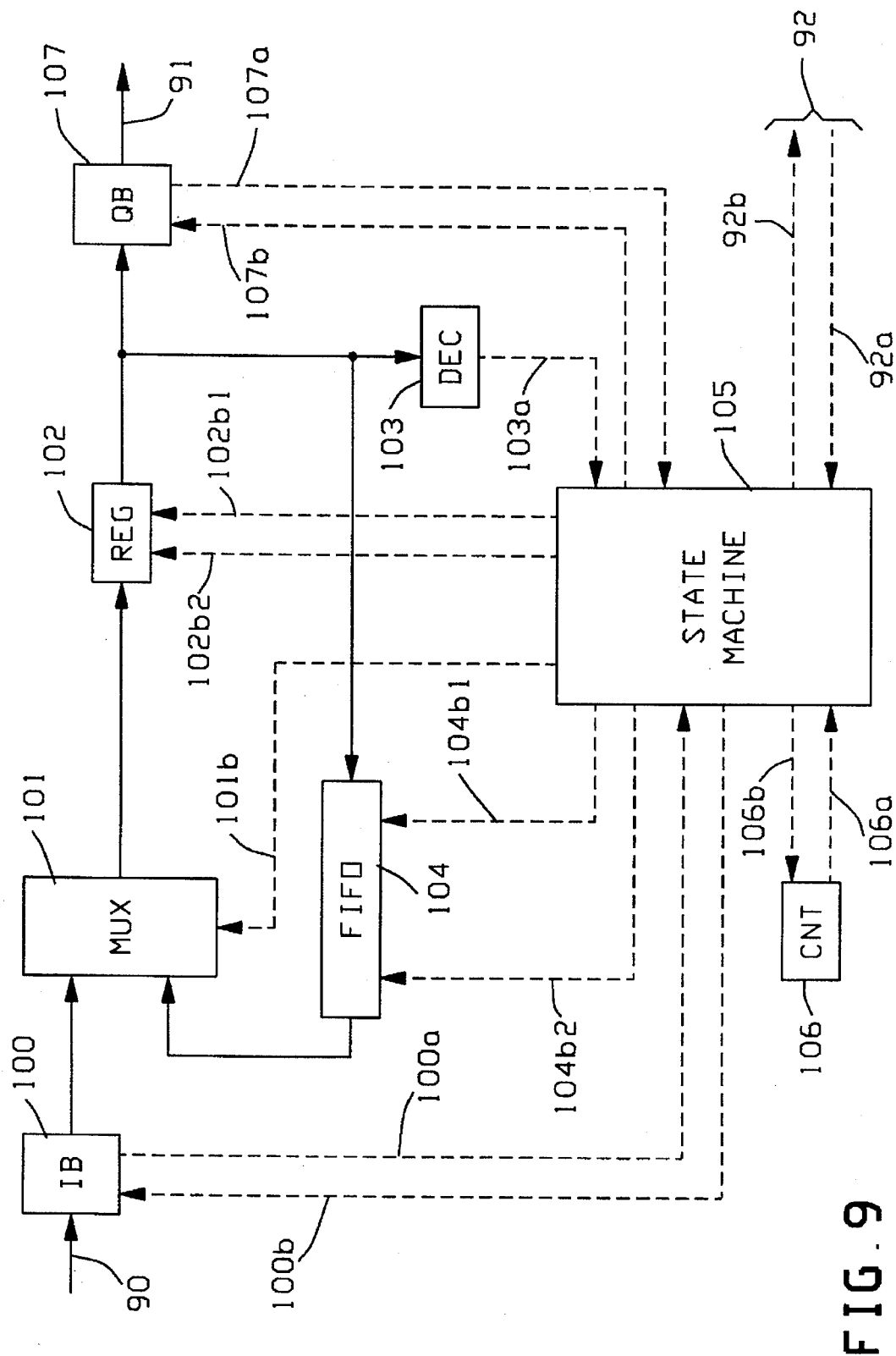
FIG. 9 is a detailed circuit diagram of a preferred internal structure for a digital control circuit that is included within the FIG. 8 message routing circuit.

Each of the modules 86-1 thru 86-5 is a digital logic control circuit; and a preferred internal structure for this control circuit is shown in FIG. 9. Control circuit 86-1 examines each message which is received on the $+X$ input channel 81a, and it directs those messages to pass through the switch circuit 85 in accordance with the process steps of FIGS. 2–7. Each of the other control circuits 86-2, 86-3, 86-4, and 86-5 respectively process messages on the input channels 82a, 83a, 84a, and 85a in the same fashion.

All of control circuits 86-1 thru 86-5 perform the process steps of FIGS. 2–7 is parallel with each other. Consequently, two or more of the control circuits 86-1 thru 86-5 may seek to pass a message to the same output channel at the same time. To prevent such simultaneous use of any one output channel, the control circuits 86-1 thru 86-5 are respectively coupled via the signal lines L6–L10 to module 87 which is an arbiter circuit.

When any one of the control circuits has a message to pass to a particular output channel, that control circuit sends a request on one of the lines L6–L10 to the arbiter 87. If the requested output channel is available, the arbiter sends a control signal on line L11 which directs the switch 85 to make the requested connection; and, the arbiter also sends a "GO" signal back to the requesting control circuit which allows it to proceed.

When a control circuit completes its use of an output channel, that control circuit sends an END signal to the arbiter 87. In response, the arbiter signals the switch 85 to break the input channel-output channel connection, and it reassigns that output channel to another control circuit.

Next, with reference to FIG. 9, a preferred internal structure for each of the digital logic control circuits 86-1 thru 86-5 will be described. In the FIG. 9 circuit, item 90 corresponds to one of the input channels 81a–85a of FIG. 8; item 91 corresponds to one of the signal lines L1–L5 of FIG. 8; and item 92 corresponds to one of the signal lines L6–L10 of FIG. 8.

Inside the FIG. 9 circuit are several components 100–107. These components are described below in table 1, and they are interconnected as shown in FIG. 9.

TABLE 1

| COMPONENT | DESCRIPTION |
|---|---|
| 100 | An input buffer which receives one character from the input channel and indicates the presence of that character by generating a signal on line 100a. Then in response to a signal on line 100b, it conditions itself to receive another character from the input channel. |
| 101 | A two-input one-output multiplexor which passes characters from one input or the other in response to a signal on line 101b. |
| 102 | A register which receives characters from the multiplexor 101 in response to a control signal on a line 102b1. Also, in response to signals on line 102b2, the register: a) deletes the character, b) decrements the "X" portion of an $L_n(X,Y)$ or $L_y(X,Y)$ character, c) decrements the "Y" portion of an $L_n(X,Y)$ or $L_y(X,Y)$ character; and d) deletes the "$S_e$" portion of an "$eS_e$" character. |
| 103 | A decoder which examines the character in register 102 and generates signals on outputs 103a which identifies each of the following character types:<br>a) $L_n(X,Y)$ or $L_y(X,Y)$ with X≠0 and Y≠0<br>b) $L_n(X,Y)$ or $L_y(X,Y)$ with X=0 and Y≠0<br>c) $L_n(X,Y)$ or $L_y(X,Y)$ with X≠0 and Y=0<br>d) $L_n(X,Y)$ with X = 0 and Y=0<br>e) $L_y(X,Y)$ with X = 0 and Y=0<br>f) $S_b$<br>g) $eS_e$<br>h) e |
| 104 | A first-in-first out (FIFO) memory which stores characters from the register 102 and sends characters to the multiplexor 101. Each character is stored in response to a control signal on a line 104b1 and each character is sent to the FIFO output in response a control signal on a line 104b2. |
| 105 | A state machine which monitors all of the signals that are generated on its input lines 100a, 103a, 106a, 107a, and 92a. In response to those signals, the state machine carries out the process steps of FIGS. 2–7 by sending control signals to its output lines 100b, 101b, 102b1, 102b2, 104b1, 104b2, 106b, 107b, and 92b. |
| 106 | A counter which keeps track of nested branches for the state machine 105 This counter selectively counts up or down by one in response to control signals on line 106b, and it indicates when a count of zero occurs by a signal on line 106a. |
| 107 | An output buffer which responds to a control signal on line 107b by receiving one character from register 102 and sending that character to the output channel. A signal on line 107a indicates when the character is sent. |

In operation, the state machine 105 carries out the process steps of FIGS. 2–7 as follows. When the first character of a lead header is received by the input buffer 100, the presence of that character is indicated by a signal on line 100a. In response, the state machine moves that character through the multiplexor 101 and into register 102 by generating control signals on its output lines 101b and 102b. Then the input buffer 100 is conditioned to receive the next character by a signal on line 100b.

Thereafter the state machine 105 determines what type of character is in register 102 by examining the signals from the decoder 103 on lines 103a. Based on what that character is, the state machine 105 initiates whatever action is needed to carry out the process of FIGS. 2–7.

For example, when register 102 holds the first character 30 of FIG. 3 (which is Ln(0,0)), then that character is dropped by sending a signal to register 102 on line 102b2.

Next, to process the second character 31 of FIG. 3 (which is $S_b$), the state machine 105 monitors line 100a to determine when that character is in the input buffer. Then that character is moved through the multiplexor and into register 102, whereupon the input buffer is conditioned to receive the third character 32.

Then the state machine 105 determines that character 31 is a branch character $S_b$ by examining the decoder output lines 103a. In response, the branch character is dropped in register 102 and the state machine begins to perform the task of finding the start and end of the two arms of the branch.

To start the above task, the state machine 105 moves the third character 32 (which is a $L_y(1,0)$) from the input buffer 100 to register 102 and examines the decoder lines 103a. In response to the $L_y(1,0)$ character, the state machine 105 requests the +X output channel by sending a signal on line 92b to the arbiter. When the +X output channel is obtained, the state machine 105 changes the $L_y(1,0)$ to $L_y(0,0)$ to reflect the channel selection. This is achieved by sending a control signal on line 102b2 to register 102.

Thereafter, the $L_y(0,0)$ character in register 102 is moved to the output buffer 107 by a signal on line 107b from the state machine 105. Similarly, all of the characters which follow inside the lead header $H_{L1}$ up to character 33 are passed from the input buffer 100 to the output buffer 107.

Within those lead header $H_{L1}$ characters, the nested branch characters 36a and 36a' are encountered. When character 36a is in register 102, the state machine detects its presence and increments the counter 106. When character 36a' is in register 102, the state machine 105 detects its presence and decrements the counter 106.

Thus, when character 33 (which is $eS_e$) is in register 102, the counter 106 holds a count of zero. This zero count together with a $eS_e$ character identifies the end of the first arm of the branch. In response thereto, the state machine 105 sends a signal on line 102b2 which causes register 102 to drop the "$S_e$" portion of the "$eS_e$" character. This leaves just the "e", which indicates that the data D follows immediately thereafter. That "e" is then sent to the output buffer 107.

Next in the input buffer 100, all of the characters of the trail header $H_{T1}$ are sequentially received; and, all of those characters are stored in the FIFO 104. These characters move from the input buffer 100 through the multiplexor 101 and register 102 and into the FIFO 104 in response to state machine signals on lines 100b, 101b, 102b1, and 104b1.

When character 35 (which is an "e") passes into register 102, it is identified by the state machine 105 as the end of the trail header and beginning of the data D. Thereafter, all of the data characters D are passed from the input buffer 100 to the output buffer 107 under control signals from the state machine 105; and simultaneously, those data characters are stored in the FIFO 104 behind the trail header $H_{T1}$.

After the last data character passes through the output buffer, the state machine 105 sends a signal on line 92b to the arbiter 87 which indicates that its use of the selected output channel is complete. Then, the state machine 105 sequentially retrieves the trail header characters and the data characters from the FIFO 104, and it processes those characters in a fashion similar to the lead header processing.

An important feature of the above described message routing process is that it enables the data D to be distributed to many scattered nodes very quickly. This feature occurs due to the tree-shaped paths which the disclosed message routing process forms, as compared to a conventional process wherein a series of point-to-point messages would be sequentially sent from the source node S to each of the receiving nodes R.

As a quantitative measure of the above feature, consider just the lower lefthand corner of FIG. 1 where the data D from the source node N(5,4) is received by five nodes N(0,0), N(2,1), N(2,0), N(3,0) and N(3,1). These five nodes are listed below in column A of TABLE 2.

TABLE 2

| COL. A | COL. B | COL. C |
| --- | --- | --- |
| N(0,0) | $10T_2 + T_D$ | $10T_R + T_D$ |
| N(2,1) | $10T_R + T_D + 2T_R + T_D$ | $10T_R + T_D + 7T_R + T_D$ |
| N(2,0) | $10T_R + T_D + 2T_R + T_D + T_R + T_D$ | $10T_R + T_D + 7T_R + T_D + 8T_R + T_D$ |
| N(3,0) | $10T_R + T_D + T_R + T_D$ | $10T_R + T_D + 7T_R + T_D + 8T_R + T_D + 7T_R + T_D$ |
| N(3,1) | $10T_R + T_D + T_R + T_D$ | $10T_R + T_D + 7T_R + T_D + 8T_R + T_D + 7T_R + T_D + 6T_R + T_D$ |

With the presently disclosed message routing process, the time that it takes for each of the five nodes N(0,0), N(2,1), N(2,0), N(3,0) and N(3,1) to receive the data D from node N(5,4) is expressed in the terms $T_R$ end $T_D$ in column B of Table 2. $T_R$ is the average time interval that it takes for a message routing circuit MRC in FIG. 1 to request and obtain the use of an output channel; and, $T_D$ is the average time interval that it takes for the data portion D of a message to pass from a source node S to a receiving node R after the message routing path between those nodes has been completely established. By comparison, when those nodes are sequentially sent a separate point-to-point message from node N(5,4), the time that it would take for each of them to receive the data D is listed in column C of Table 2.

Inspection of the bottom entry of column B shows that with the disclosed message routing process, all five of the nodes have received the data D after a time interval of $13T_R + 5T_D$. By comparison, the last entry of column C shows that when a series of point to point messages are sent, all five of the node receive the data D after a time interval of $38T_R + 5T_D$.

Thus, even with just this simple five node example, the improvement is well over 200%. Further, that percent improvement continues to increase as the number of receiving nodes increases.

Another important feature of the above described message routing process is that it reduces congestion in the parallel processor array by making efficient use of the input/output channels. This feature can be deduced from columns B and C of Table 2. In particular, the largest entry in column B shows that with the present invention, a series of channels from node N(5,4) to node N(2,0) is in use for a total time of $13T_R + 3T_D$. By comparison, the largest entry in column C shows that when a series of point-to-point messages is sent, a series of channels from node N(5,4) to node N(2,0) is in use for a total time of $38T_R + 5T_D$. While that series of channels is in use, all other messages which need to pass on any one of those channels will be delayed.

Still another feature of the above described message routing process is that it accommodates multipath adaptive routing between two non-adjacent nodes. This feature is seen from the description of FIGS. 4 and 5. In FIG. 4, the message routing circuit MRC(5,3) has a choice of selecting either the −X or +Y output channel; and in FIG. 5, the message routing circuit MRC(6,3) has a similar channel selection choice. If one particular output channel is busy, then the message routing circuit can select the other output channel to thereby reduce the delay $T_R$ that it takes to obtain an output channel. Also, in selecting a particular output channel, the potential for a deadlock preferably is avoided by a process which is described in copending patent application Ser. No. 08/236,439 entitled, "Multi-Path Message Routing Without Deadlocks" by the present inventor and assigned to the present assignee.

A preferred method of passing messages through a parallel processor in accordance with the present invention, as well as a preferred circuit for carrying out that process, has now been described in detail. In addition, however, several changes and modifications can be made to the described preferred process and circuit without departing from the scope of the invention.

For example, in the process of FIGS. 2–7, the lead header and the data D are passed through a message routing circuit MRC before the trail header and the data D; but as an alternative, that order can be reversed. To implement this modified process with the FIG. 9 circuit, the state machine 105 would simply perform the following sequence of steps: 1) store the lead header in the FIFO 104, 2) modify the trail header to reflect the selection of a first output channel and pass the modified trail header to that first output channel, 3) pass the data to that first channel behind the modified trail header while simultaneously storing the data in the FIFO 104; 4) modify the stored lead header to reflect the selection of a second output channel and pass the modified lead header to the second output channel; and 5) pass the stored data to that second output channel behind the lead header.

As another modification, the "$S_b$" character which indicates the start of a branch in FIGS. 3–7 can be replaced with any other predetermined start-branch control character. Similarly, the "$eS_s$" character which indicates the end of a branch arm in FIGS. 3–7 can be replaced with any other predetermined end-branch control character. Likewise, the start-data control character "e" and the destination control characters "Ln(,)" and "$L_y$(,)" in FIGS. 3–7 can be replaced with any other predetermined control characters.

As still another modification, the input-output channels which carry the characters of FIGS. 3–7 can have any conventional internal make up. For example, those input-output channels can serially carry the bits of each character, one bit at a time; or, they can carry all of the bits of any one character in parallel. Here, the number of bits per character can be any desired number such as eight or thirty two. Similarly, the input-output channels can carry the characters in synchronization with a clock signal, or asynchronously without a clock signal.

As yet another modification, the message routing circuit of FIG. 8 and the control circuit of FIG. 9 can be implemented with any conventional digital logic technology. For example, CMOS logic or $T^2L$ logic or ECL logic can be used. Likewise, the message routing circuit of FIG. 8 and the control circuit of FIG. 7 can be implemented with several semi-custom integrated circuit chips or a single fully custom integrated circuit chip. Suitable semi-custom chips are the Motorola MCA 2900ETL macro cell array and the Plus 405-55 Field Programmable Logic Sequencer.

Accordingly, it is to be understood that the invention is not limited to the details of any one particular preferred embodiment, but is defined by the appended claims.

What is claimed is:

1. A method of passing a message through a message routing circuit which has multiple input channels and multiple output channels; said method including the steps of:
    examining said message, as it is received on one of said input channels, to determine that said message contains a series of control characters followed by data;
    identifying in said series of control characters, spaced apart pairs of start-branch and end-branch control characters which delineate a lead header and a trail header as well as at least one nested subheader, and where to identify the end of said lead and trail headers, the substep of counting each pair of start-branch and end-branch control characters is performed;
    selecting a first output channel solely in response to said control characters in one of said headers and storing a second one of said headers;
    modifying said first one of said headers to reflect said selection of said first output channel and sending the modified first one of said headers on said first output channel;
    storing said data while simultaneously sending said data on said first output channel after said modified first one of said headers;
    selecting a second output channel solely in response to said control characters in the stored second one of said headers and modifying that same header to reflect said selection of said second output channel; and,
    sending the modified second one of said headers followed by said stored data on said second output channel.

2. A method according to claim 1 wherein said first output is selected in response to said lead header.

3. A method according to claim 1 wherein said first output is selected in response to said trail header.

4. A method according to claim 1 which further includes the substeps of identifying a destination control character at the start of said lead header which indicates that a destination for said message has been reached, and identifying a start-branch control character immediately after said destination control character which indicates that said trail header occurs in said message.

5. A method according to claim 1 which further includes the substeps of identifying said lead header as consisting of a sequence of characters which begins with a destination control character and stops with an end-branch control character, and identifying said trail header as consisting of a sequence of characters which begins immediately after said end-branch control character and stops with a start-data control character.

6. A method according to claim 1 wherein said lead header includes multiple pairs of start-branch and end-branch control characters with each such pair indicating the presence of a nested subheader; and wherein to find the end of said lead header, the substep of counting each such pair is performed.

7. A method according to claim 1 wherein said lead header starts with a destination control character which has a particular value that indicates the message has reached a selected destination, followed immediately by a start-branch control character followed immediately by another destination control character, and wherein said first output channel is selected in response to the latter destination control character.

8. A method according to claim 1 wherein said lead header starts with a destination control character, which has a particular value that indicates the message has reached a selected destination, followed immediately by a start-branch control character followed immediately by another destination control character, and wherein said modified lead header as sent on said first output channel is formed by the substeps of—a) removing said destination control character and a branch control character from the start of said lead header, b) modifying said immediately following destination control character to reflect the selection of said first output channel, and, c) replacing an end-branch control character at the end of said lead header with a start-data control character.

9. A method according to claim 1 wherein said trail header begins with a destination control character which follows immediately after an end-branch control character in said lead header, and wherein said first output channel is selected in response to said destination control character.

10. A method according to claim 1 wherein said modified trail header as sent on said first output channel is formed by the substep of modifying a destination control character at the start of said trail header to reflect the selection of said first output channel.

11. A method according to claim 1 wherein said trail header includes multiple pairs of start-branch and end-branch control characters with each such pair indicating the presence of a nested subheader; and wherein all such pairs remain unchanged in said modified trail header.

12. A method according to claim 1 and further including the substeps of identifying a destination control character, at the start of said lead header, as being a particular one of two different destination control characters; and, sending said stored data to a predetermined third output channel in response thereto.

13. A method according to claim 1 wherein all of said steps are performed by digital logic circuits under the control of a digital state machine.

14. A method according to claim 1 wherein on at least two of said input channels, respective messages are received at the same time and wherein for each such message, said steps are respectively performed at the same time.

* * * * *